(12) United States Patent
Kondguli et al.

(10) Patent No.: US 11,538,221 B2
(45) Date of Patent: Dec. 27, 2022

(54) RE-REFERENCE AWARE TILE WALK ORDER FOR PRIMITIVE BINNER

(71) Applicant: Samsung Electronics Co., Ltd., Suwon-si (KR)

(72) Inventors: Sushant Kondguli, San Jose, CA (US); Nilanjan Goswami, Livermore, CA (US)

(73) Assignee: SAMSUNG ELECTRONICS CO., LTD.

( * ) Notice: Subject to any disclaimer, the term of this patent is extended or adjusted under 35 U.S.C. 154(b) by 0 days.

(21) Appl. No.: 17/099,767

(22) Filed: Nov. 16, 2020

(65) Prior Publication Data

US 2021/0366188 A1 Nov. 25, 2021

Related U.S. Application Data

(60) Provisional application No. 63/028,553, filed on May 21, 2020.

(51) Int. Cl.
*G06T 17/10* (2006.01)
*G06T 1/20* (2006.01)
*G06T 15/00* (2011.01)

(52) U.S. Cl.
CPC ............. *G06T 17/10* (2013.01); *G06T 1/20* (2013.01); *G06T 15/005* (2013.01)

(58) Field of Classification Search
CPC combination set(s) only.
See application file for complete search history.

(56) References Cited

U.S. PATENT DOCUMENTS

| | | | |
|---|---|---|---|
| 6,784,894 B2 | 8/2004 | Schimpf et al. | |
| 9,122,646 B2 | 9/2015 | Ellis et al. | |
| 9,619,937 B2 | 4/2017 | Persson et al. | |
| 9,799,088 B2 | 10/2017 | Frascati et al. | |
| 10,409,359 B2 | 9/2019 | Nellutla | |
| 2007/0296725 A1* | 12/2007 | Steiner | G06T 15/005 345/505 |
| 2013/0076761 A1* | 3/2013 | Ellis | G06T 1/20 345/502 |
| 2014/0118362 A1* | 5/2014 | Hakura | G06F 9/38 345/505 |

(Continued)

*Primary Examiner* — Sing-Wai Wu
*Assistant Examiner* — Khoa Vu
(74) *Attorney, Agent, or Firm* — Renaissance IP Law Group LLP

(57) ABSTRACT

A method to process tiles of a screen space includes determining a tile-processing order for tiles of a first batch of primitives based on a tile-processing order for a second batch of primitives in which the second batch of primitives are processed prior to the first batch of primitives. The tiles of the first batch of primitives are processed based on the tile-processing order determined for the tiles of the first batch of primitives. The tile-processing order is updated as tiles of the first batch of primitives are pushed to a backend processing portion of a graphics processing unit. In one embodiment, determining the tile-processing order for the tiles of the first batch of primitives include arranging the tiles of the first batch of primitives that have a same screen-space as tiles of the second batch of primitives based on a most-recently-processed-tile-to-a-least-recently-processed tile order of the second batch of primitives.

20 Claims, 8 Drawing Sheets

(56) References Cited

U.S. PATENT DOCUMENTS

| | | | |
|---|---|---|---|
| 2015/0213638 A1* | 7/2015 | Dimitrov | G06T 1/60 |
| | | | 345/619 |
| 2016/0371873 A1* | 12/2016 | Mantor | G06T 15/04 |
| 2017/0053375 A1* | 2/2017 | Bolz | G09G 5/363 |
| 2017/0365031 A1* | 12/2017 | Lee | G06T 11/40 |
| 2019/0122417 A1 | 4/2019 | Mantor et al. | |
| 2019/0220411 A1 | 7/2019 | Nellutla et al. | |
| 2020/0098169 A1 | 3/2020 | Wu et al. | |
| 2020/0151926 A1 | 5/2020 | Uhrenholt | |
| 2021/0211701 A1* | 7/2021 | George | H04N 19/167 |

* cited by examiner

RE-REFERENCE AWARE TILE WALK ORDER FOR PRIMITIVE BINNER

CROSS-REFERENCE TO RELATED APPLICATION

This application claims the priority benefit under 35 U.S.C. § 119(e) of U.S. Provisional Application No. 63/028,553, filed on May 21, 2020, the disclosure of which is incorporated herein by reference in its entirety.

TECHNICAL FIELD

The subject matter disclosed herein relates to graphic processing units (GPUs). More particularly, the subject matter disclosed herein relates to a method for a graphics processing unit (GPU) that changes a binning processing order to reduce DRAM traffic.

BACKGROUND

Primitives from different draw calls are processed in sequence in a typical graphics hardware pipeline. In a binning architecture of a graphics hardware pipeline, a binner processes each primitive and marks the screen-space tiles that a primitive occupies. That is, the binner maintains a list of screen-space tile buckets that contains a list of primitives that occupy the screen-space tile. The binning process may be performed for the entire set of primitives across the draws, within a subframe, or for a batch of an entire set of primitives. For example, a binning architecture may use a batch-based binning process in which the binner distributes primitives across batches and bins the primitives of each batch separately instead of binning an entire set of primitives at one time. The size of each batch may be determined at runtime based on various resource constraints and/or Application Programming Interface (API) constraints.

SUMMARY

An example embodiment provides a method to process tiles of a screen space in which the method may include: determining a tile-processing order for tiles of a first batch of primitives based on a tile-processing order for a second batch of primitives in which the second batch of primitives may be processed prior to the first batch of primitives; processing the tiles of the first batch of primitives based on the tile-processing order determined for the tiles of the first batch of primitives; and updating the tile-processing order as tiles of the first batch of primitives are processed. In one embodiment, the method may further include processing the tiles of a third batch of primitives based on the tile-processing order updated as tiles of the first batch of primitives are processed in which the third batch of primitives being subsequent to the first batch of primitives; and updating the tile-processing order as tiles of the third batch of primitives are processed. In another embodiment, a tile-processing direction of the first batch of primitives is opposite to a tile-processing direction of the second batch of primitives. In still another embodiment, a number of tiles of the first batch of primitives may include n tiles, and a number of tiles of the second batch of primitives comprises n tiles, the tile-processing order for the second batch of primitives may include an order of a least-recently processed tile to a most-recently used tile for the n tiles of the second batch of primitives, and in which determining the tile-processing order for tiles of the first batch of primitives may include ordering m tiles of the first batch of primitives that have a same screen-space as m tiles of the second batch of primitives to correspond the tile-processing order for the m tiles of the second batch of primitives in which m is less than or equal to n.

An example embodiment provides a method to process tiles of a screen space in which the method may include: determining a tile-processing order for tiles of a first batch of primitives based on an observed tile-processing order in which the first batch of primitives may include n tiles, the observed tile-processing order may be based on an order of a least-recently processed tile to a most-recently used tile for a second batch of primitives, the second batch of primitives may include n tiles, and the second batch of primitives may be processed prior to the first batch of primitives; and processing the tiles of the first batch of primitives based on the tile-processing order determined for the tiles of the first batch of primitives. In one embodiment, the method may further include updating the observed tile-processing order as tiles of the first batch of primitives are processed. In another embodiment, determining the tile-processing order for tiles of the first batch of primitives may include ordering m tiles of the first batch of primitives that have a same screen-space as m tiles of the second batch of primitives to correspond the tile-processing order for the m tiles of the second batch of primitives in which m is less than or equal to n.

An example embodiment provides a method to process tiles of a screen space in which the method may include: determining a tile-processing order for tiles of a first batch of primitives based on a tile-processing order for a second batch of primitives, the second batch of primitives may be processed prior to the first batch of primitives, the tile-processing order for the tiles of the first batch of primitives may include an ordering of tiles of the first batch of primitives that may be based on a temporal proximity of tiles of the first batch of primitives with a most-recently-processed-tile-to-a-least-recently-processed tile order of the second batch of primitives; processing the tiles of the first batch of primitives based on the tile-processing order determined for the tiles of the first batch of primitives; and updating the tile-processing order as tiles of the first batch of primitives are processed. In one embodiment, the method may further include processing the tiles of a third batch of primitives based on the tile-processing order updated as tiles of the first batch of primitives are processed in which the third batch of primitives may be subsequent to the first batch of primitives; and updating the tile-processing order as tiles of the third batch of primitives are processed. In another embodiment, a tile-processing direction of the third batch of primitives may be opposite to a tile-processing direction of the first batch of primitives.

BRIEF DESCRIPTION OF THE DRAWING

In the following section, the aspects of the subject matter disclosed herein will be described with reference to exemplary embodiments illustrated in the figure, in which.

DETAILED DESCRIPTION

Figure 1:
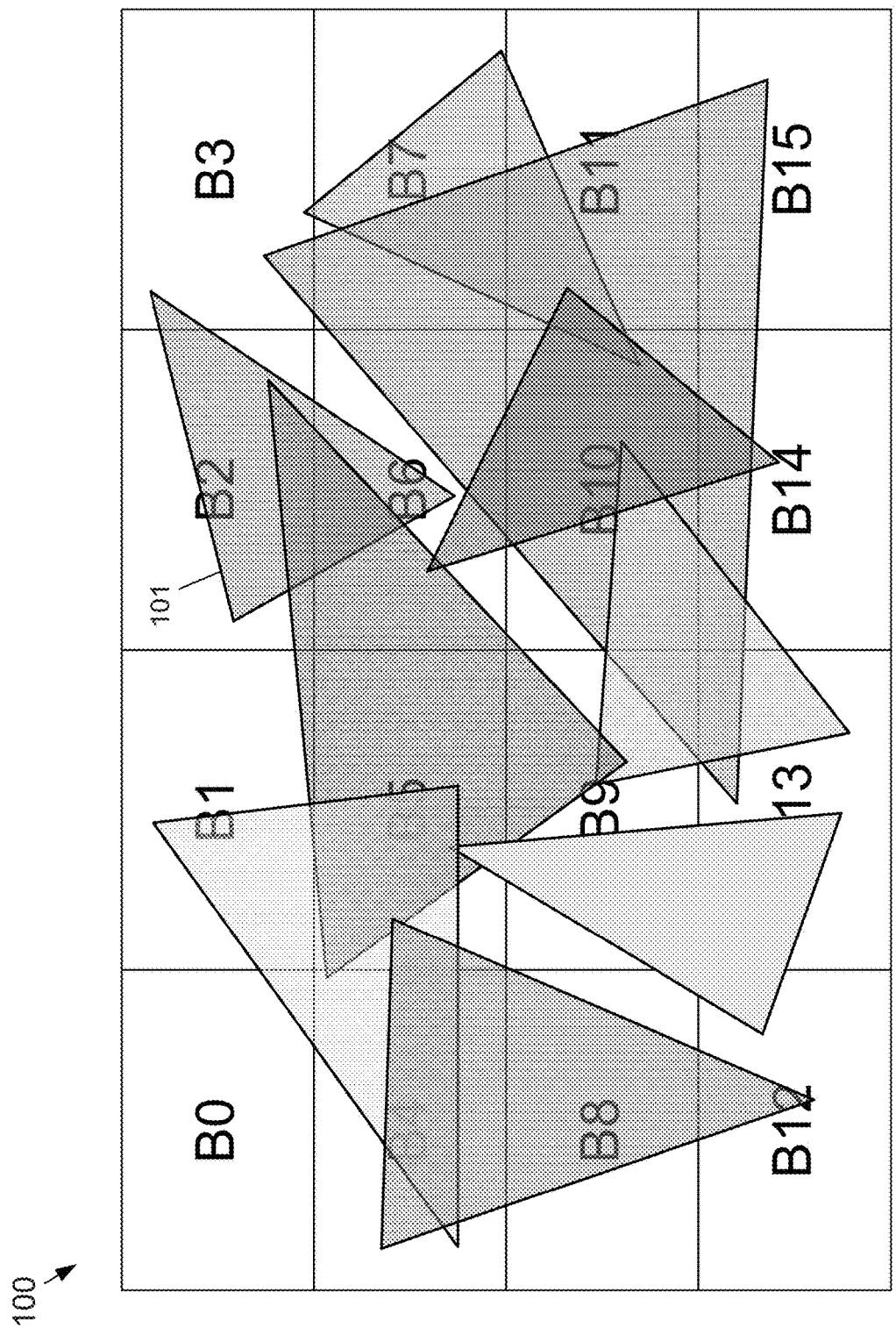
FIG. 1 depicts an example screen space that includes a number of primitives.

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

A binning process performed by a primitive binner may occur at the end of the frontend processing (for example, at the vertex/geometry processing phase of processing). Typically, each batch of primitives touches a subset of the tiles forming the screen space. The tiles may be rendered by a backend graphics hardware pipeline in a specific order (linear order, Morton order, hierarchical Morton order, etc.) and in a monotonic direction (e.g., all batches start from the top-left tile and proceed to the bottom right-tile). Consecutive batches frequently access and process the same screen space because the primitives occupying the same screen space may often be split across multiple batches. Thus, the on-chip and/or off-chip dynamic random access memory (DRAM) corresponding to a screen space may be re-referenced by primitives across batches causing increased DRAM (data) traffic that results in a lower GPU performance and an increase in power consumption. An increase in DRAM traffic may be avoided or reduced if the same screen-space tiles across batches are processed simultaneously or in close temporal proximity by the backend pipeline. By processing the same screen-space tiles simultaneously or in close temporal proximity, the data necessary for processing the primitives of a batch would be resident in on-chip or off-chip caches. Nevertheless, such a tile rendering pattern may not feasible in some graphic processor architectures.

The subject matter disclosed herein changes the order, or sequence, in which a batch processes a screen space, thereby reducing DRAM traffic. In one embodiment, the subject matter disclosed herein uses temporal data locality information that may be available in connection with a binning operation to change the order in which screen-tile spaces are processed for consecutive batches. For example, every new batch might process the screen-space tiles first that were most recently processed by the preceding batch to take advantage of any on-chip and/or off-chip caches that may have been tuned to efficiently service traffic patterns having good temporal locality. The order of processing a screen space may also be user selected to further reduce texture traffic by accessing texture data more efficiently.

The term "temporal data locality" as used herein relates to a temporal proximity of a screen-space tile of a current batch with the same screen-space tile of a previous batch. For example, if it is determined that a screen-space tile of a current batch is the same screen-space tile that was processed toward or at the end of the previous batch, then the screen-space tile of the current batch has temporal data locality with the same screen-space tile of the previous batch, and the tile-processing order to the screen-space tile of the current batch is moved toward the beginning of the tile-processing order of the current batch. To illustrate this, consider a situation in which a screen space includes 16 tiles and all 16 of the tiles of the previous batch were processed the top-left to the bottom-right of the screen space, as is commonly done. If the current batch also includes primitives that cover all 16 of the tiles, according to the subject matter disclosed herein the tile-processing order for the current batch would be a mirror image of the tile-processing order of the previous batch. That is, the tile-processing order for the current batch would be from the bottom-right to the top-left of the screen space.

In one embodiment, the subject matter disclosed herein may reverse tile-processing order across consecutive batches so that a screen-space tile that is present in a cache is processed first and additional DRAM traffic is not incurred. The subject matter disclosed herein may also register the order in which the screen-space tiles have been processed by previous batches. Each new batch updates the order, and every new batch reorders its screen processing based on the past order, which tends to reduce DRAM traffic.

Often, the number of screen-space tiles processed by a particular batch is too great to entirely fit in a cache. After the entire batch has been processed, an allocation policy of the data caches ensures that only the screen-space tiles processed at the very end of the batch are resident in the cache. The subject matter disclosed herein utilizes the allocation policy and arranges for the next batch to access the data while it is present in the cache. Consequently, the subject matter disclosed herein may significantly reduce the overall DRAM traffic incurred by, for example, a mobile GPU. The DRAM traffic reduction also improves performance of the GPU during time intervals that would otherwise be bottlenecked by memory bandwidth, which improves the overall performance of the GPU. The DRAM traffic reduction also helps reduce power consumption by, for example, an SOC embodying a GPU and, in turn, provides an improved a power budget for the GPU.

The subject matter disclosed herein provides a re-reference aware tile-processing order that may modify a tile-processing order and/or a tile-processing direction across batches so that the same screen-space tiles (across batches) may be processed simultaneously as much as possible or in close temporal proximity with a minimal change in GPU architecture. A first few and a last few of the tiles of simultaneous batches may experience locality, and in its simplest form, the subject matter disclosed herein may change tile-processing direction across simultaneous batches, and color and depth cache locality may be captured for temporally local tiles.

FIG. 1 depicts an example screen space 100 that includes a number of primitives 101, of which only one primitive 101 is indicated. A batch-based primitive-rendering pipeline may perform primitive-to-tile mapping (binning) in a batch-by-batch manner. Batches may include different sets of primitives. The tile coverage for the primitives in a screen space may also be distinct, and tiles (B0, B1, . . . , B15) often reappear across batches.

Typically, a subset of tiles of a screen space may be touched by a batch of primitives. Tiles that are touched are processed by the graphics backend pipeline in a rendering order that is typically from the top-left to the bottom-right of the screen space, as indicated by a path shown by arrows in FIG. 2. That is, tiles are processed from tile Bin 0 through tile Bin 4, then to tile Bin 5 through tile Bin 7, and so on.

The same screen-space tiles are often processed across batches of primitives. Relatively smaller batches may be expected to exhibit more primitive overlap with other batches, and re-referencing may be mostly related to the screen space touched by draw calls. For example, example Batches n and n+1 in FIG. 2 respectively include different primitives from the example screen space of primitives depicted in FIG. 1. Screen-space tiles (bins) B4 and B9 are processed across the Batches n and n+1.

Figure 2:
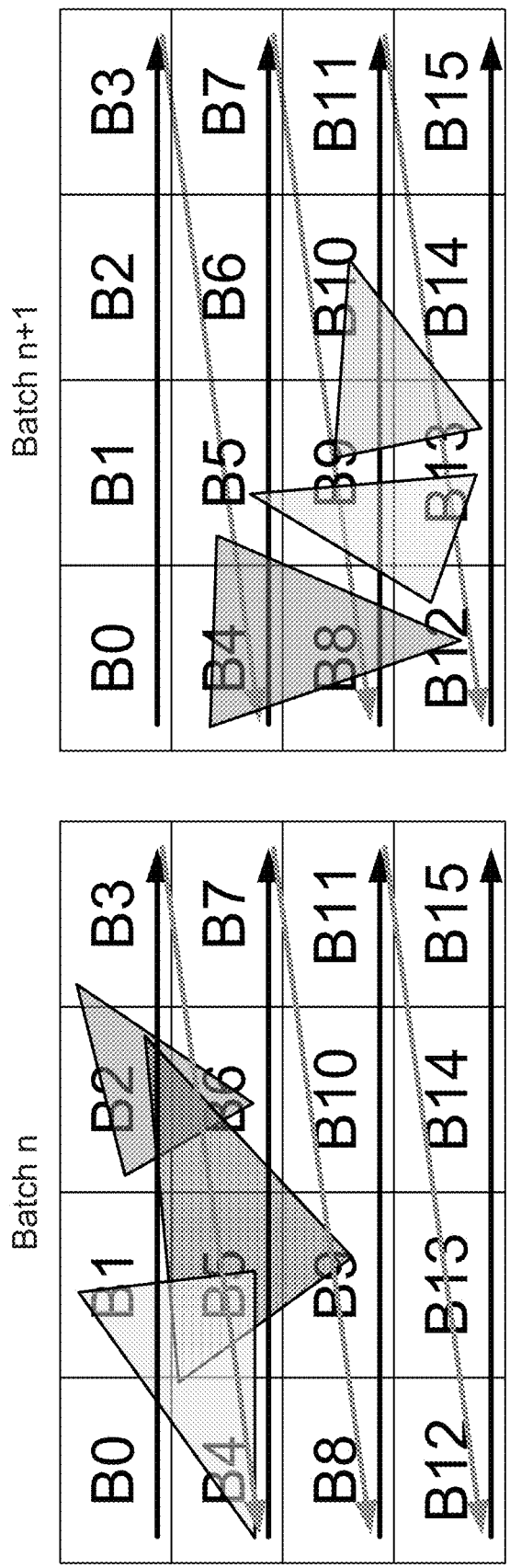
FIG. 2 depicts a traditional tile-processing order for two consecutive batches.

Referring to the Batches n and n+1 in FIG. 2, a typical DRAM traffic pattern that may be generated for Batch n may correspond to a tile-processing order from tile (bin) B0 through tile B6, then tile B9. This example of tile-processing order for Batch n may be denoted using a shorthand notation as [B0-B6, B9]. Using this shorthand notation, a typical DRAM traffic pattern that may occur for Batch n+1 may correspond to a tile-processing order [B4, B8, B9, B10, B12, B13, B14]. As described, a monotonic traversal order of the Batches n and n+1 may generate sub-optimal DRAM traffic.

Figure 3:
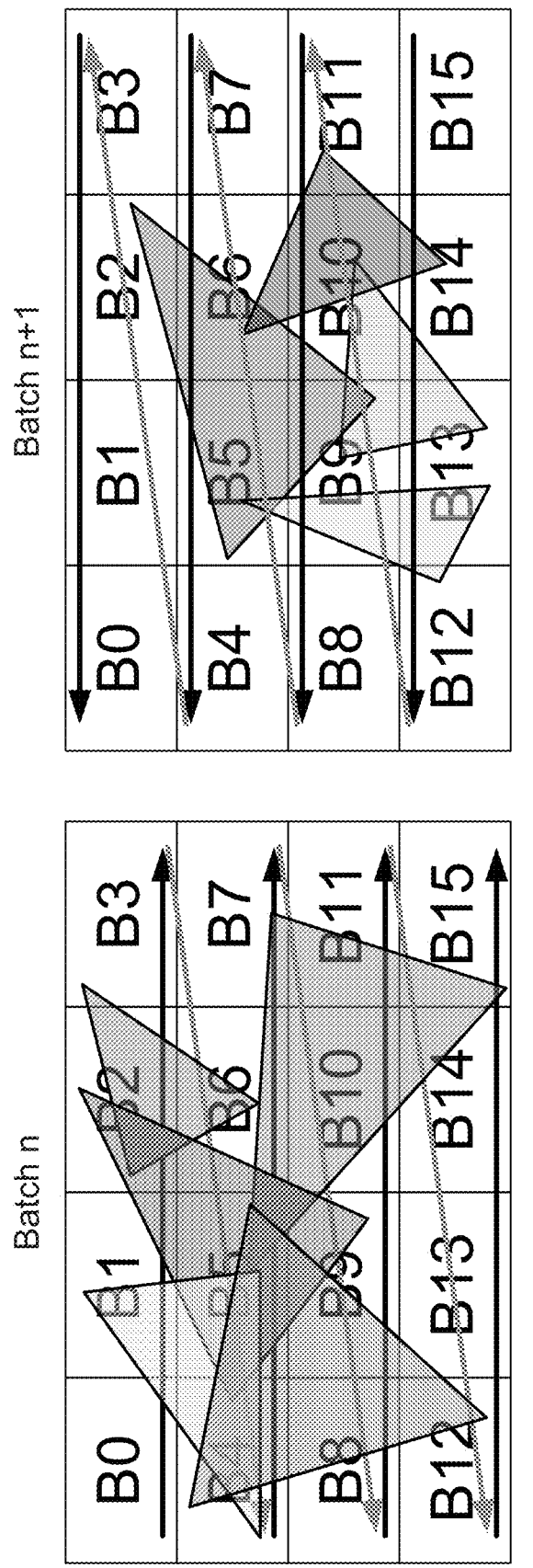
FIG. 3 depicts a tile-processing order according to the subject matter disclosed herein.

For relatively large batches, most of the tiles from a first batch may be evicted from caches before needing to be re-fetched by an immediately subsequent batch. In such cases, a Last Level Cache (LLC) may be thrashed, incurring additional DRAM traffic. For the example large Batches n and n+1 depicted in FIG. 3, a typical DRAM traffic pattern might correspond to a tile-processing order [B1-B15] for an example Batch n, and a tile-processing order [B2, B5, B6, B9, B10, B11, B12, B13, B14] for Batch n+1. A re-ordered tile-processing order according to the subject matter disclosed herein may be: [B1-B15] for Batch n, and [B14, B13, B12, B11, B10, B9, B6, B5, B2] for Batch n+1. Thus, the tile-processing order provided by the subject matter disclosed herein has not only changed the tile-processing order for Batch n+1 as compared to a typical DRAM traffic pattern, the tile-processing direction for Batch n+1 has also changed, as indicated by the path of arrows shown for Batch n+1. Such a re-ordered traffic pattern and direction may occur quite frequently in some GPU architectures.

Figure 4:
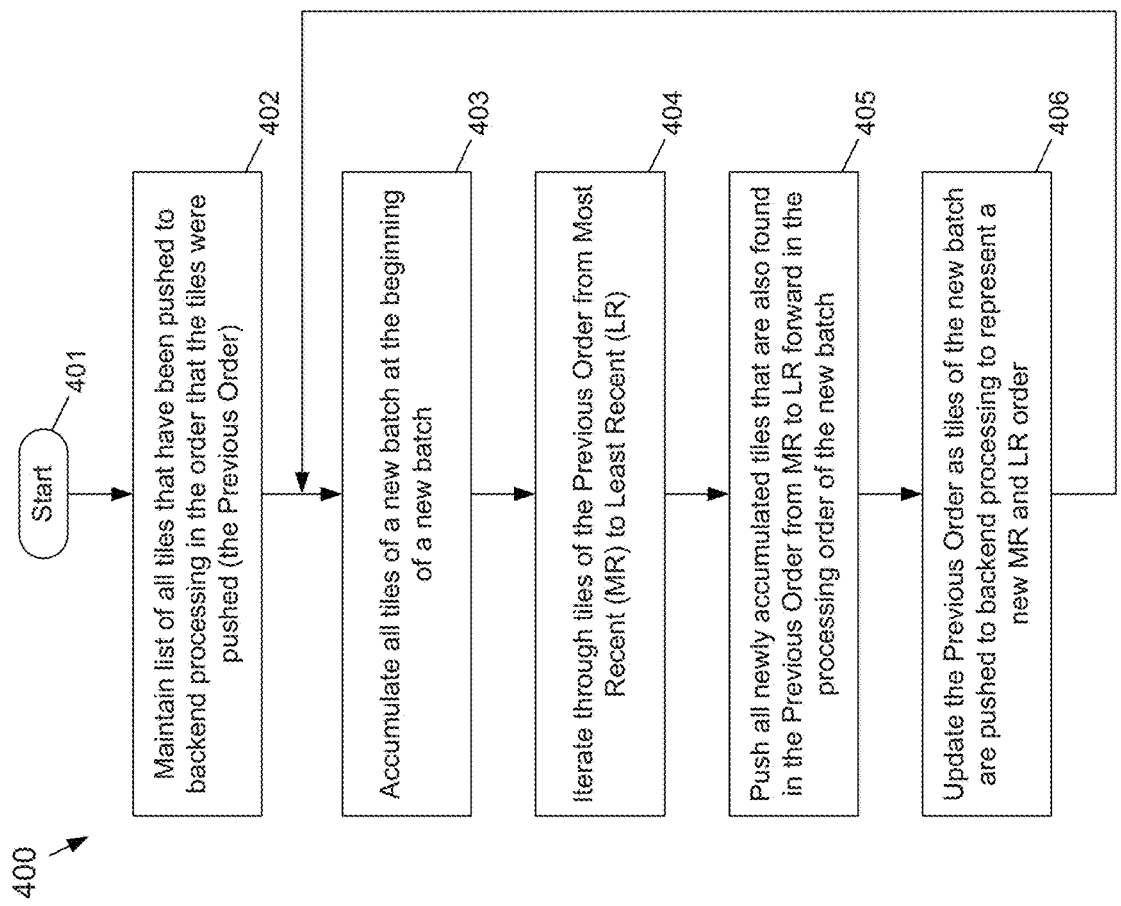
FIG. 4 is a flowchart of a process to utilize data locality in an LLC to reduce DRAM traffic according to the subject matter disclosed herein.

FIG. 4 is a flowchart of a process 400 to utilize data locality in an LLC to reduce DRAM traffic according to the subject matter disclosed herein. The process 400 starts at 401. At 402, a list is maintained of all tiles that have been pushed to backend processing in the order that the tiles were pushed (the Previous Order). If the first batch of a group of batches is being processed, the Previous Order has yet to be established, in which case the first batch is processed in a traditional manner. At 403, all tiles of a new batch are accumulated at the beginning of processing of the new batch. At 404, the tiles of the Previous Order are iterated through from the Most Recently (MR) pushed to the Least Recently (LR) pushed tiles. At 405, all of the newly accumulated tiles that are also found in the Previous Order from MR to LR are pushed forward in the processing order of the tiles of the new batch. (As mentioned, if the first batch of a group of batches is being processed, there is no Previous Order to iterate through, so 404 and 405 process the tiles of the batch in a traditional tile-processing order.) At 406, the Previous Order is updated as tiles of the new batch are pushed to backend processing to represent a new MR to LR order. At 407, the process returns to 403 for the next new batch. Process 400 continues until rendering of the screen space is complete.

The process 400 may be implemented as a module that may be embodied as any combination of software, firmware and/or hardware configured to provide the functionality of the process 400. For example, such software may be embodied as a software package, code and/or instruction set or instructions, and such hardware may include, for example, singly or in any combination, an assembly, hardwired circuitry, programmable circuitry, state machine circuitry, and/or firmware that stores instructions executed by programmable circuitry.

Example pseudo code corresponding to the process 400 is shown below.

```
Initialization ##
For every tile in screen_space: prev_order.push_back(tile)
Runtime operation ##
For every new batch:
    tile_order = prev_order
    While tile_order is not empty:
        mru_tile = tile_order.back( )
        tile_order.pop( )
        For every tile in batch
            If tile is equal to mru_tile
                push_to_backend(tile)
                batch.remove(tile)
                prev_order.remove(tile)
                prev_order.push_back(tile)
                break For loop
```

Figure 5:
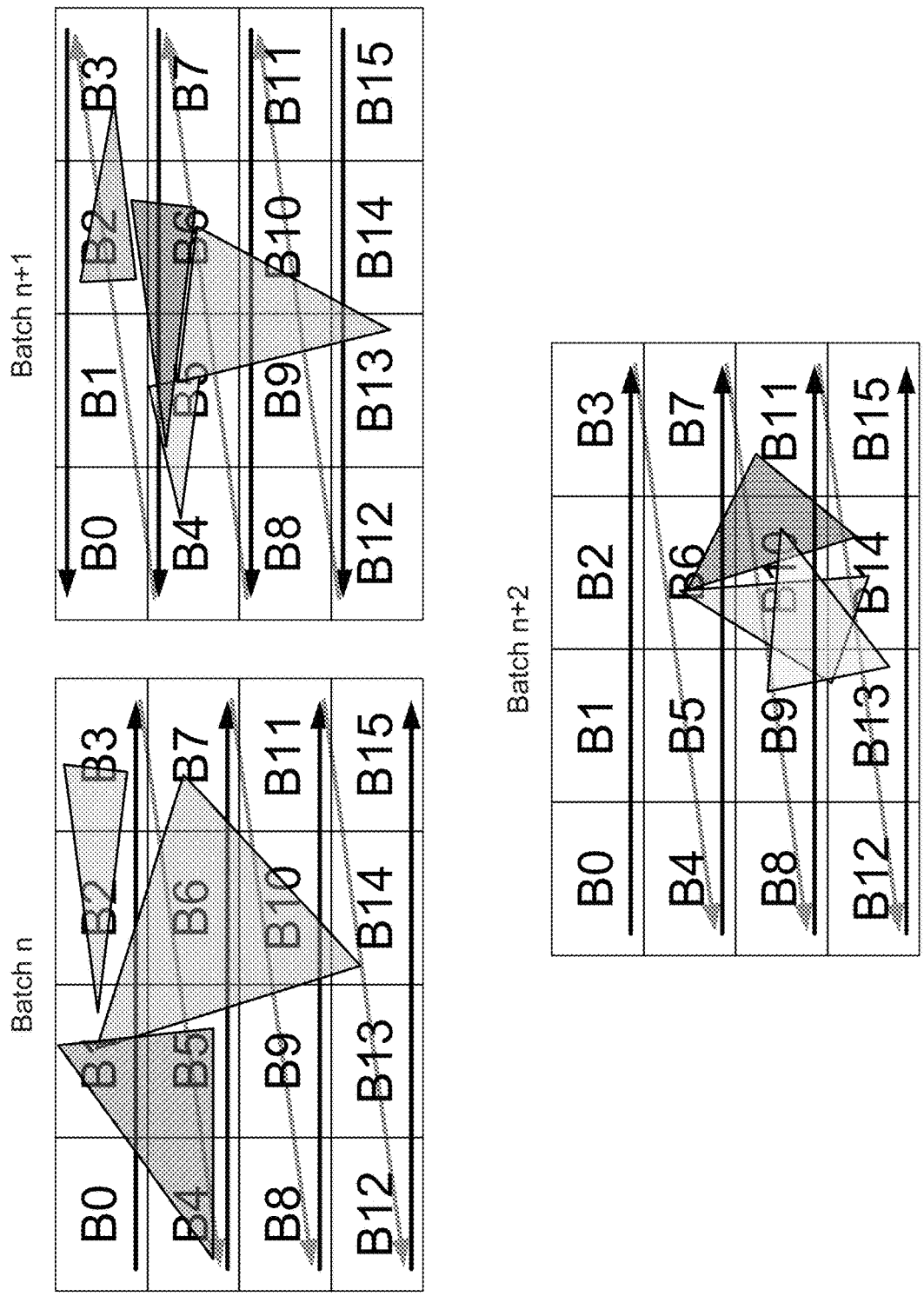
FIG. 5 depicts an example of a tile-processing order according to the subject matter disclosed herein.

FIG. 5 shows three example Batches n through n+2 to illustrate an example of using the example method 400 of FIG. 4 to utilize data locality from previous batches and change the tile-processing order to reduce DRAM traffic. For example Batch n, the example Previous Order (not shown) might be: [B0, B4, B5, B2, B1, B3, B6, B7, B9, B10, B14]. A traditional monotonic tile-processing order for Batch n+1 might be: [B1, B2, B3, B4, B5, B6, B9, B10, B13, B14]. Using the method 400, the tile-processing reordering (or the pushing forward in the processing order) of tiles of Batch n+1 would be: [B14, B10, B9, B6, B3, B1, B2, B5, B4, B13], so that the complete tile-processing order for Batch n and n+1 (denoted by Previous Order) becomes: [B0, B7, B14, B10, B9, B6, B3, B1 B2, B5, B4, B13]. Not only has the tile-processing order been changed, the tile-processing direction has changed, as indicated by the path of arrows shown for Batch n+1 when compared to the tile-processing direction of Batch n. Also note that the Previous Order maintains a list of screen space tiles in the order of least recently processed to most recently processed.

For Batch n+2 in FIG. 5, the Previous Order is: [B0, B7, B14, B10, B9, B6, B3, B1, B2, B5, B4, B13] A traditional monotonic tile-processing order for Batch n+2 might be: [B6, B9, B10, B11, B13, B14]. Using the method 400, the tile-processing reordering of tiles for Batch n+2 would be: [B13, B6, B9, B10, B14, B11], so that the updated Previous Order becomes: [B0, B7, B3, B1, B2, B5, B4, B13, B6, B9, B10, B14, B11].

Figure 6:
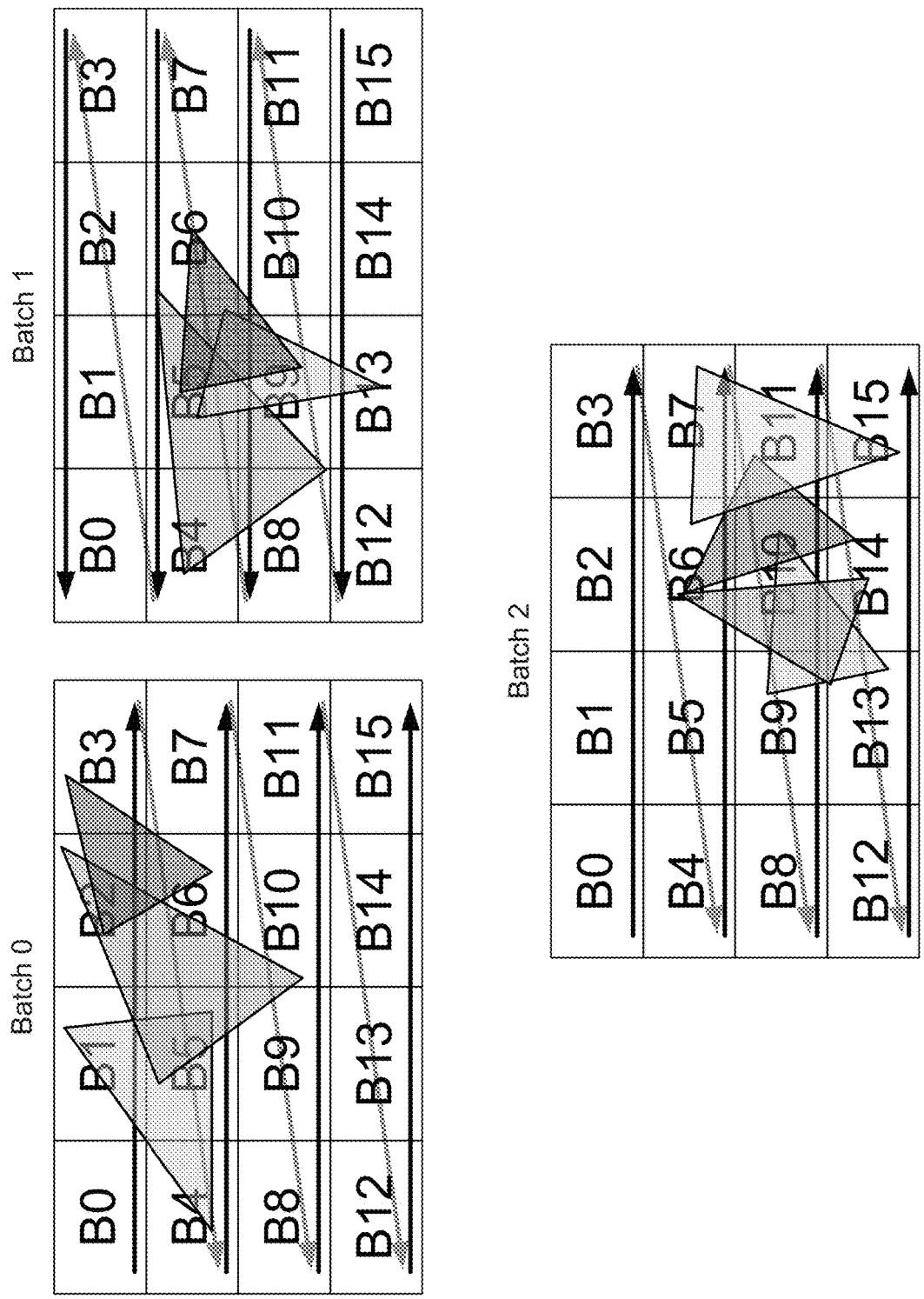
FIG. 6 depicts another example of a tile-processing order according to the subject matter disclosed herein.

FIG. 6 depicts an additional example of using the method 400 to utilize data locality in the LLC and to reduce DRAM traffic. For Batch 0, the Previous Order has not yet been generated as Batch 0 is the first batch. The traditional tile-processing order would be: [B1-B7, B9, B10]. Using the process 400, the reordered tile-processing order would: [B1-B7, B9, B10] because there is no Previous Order to iterate through, so the "new" Previous Order for Batch 1 would be: [B1, B2, B2, B3, B4, B5, B6, B7, B9, B10].

For Batch 1, the Previous Order is: [B1, B2, B2, B3, B4, B5, B6, B7, B9, B10]. The traditional monotonic tile-processing order would be: [B4, B5, B6, B9, B13]. Using the process 400, the reordered tile-processing order would be: [B9, B6, B5, B4, B13] based on the Previous Order. The new Previous Order would be: [B1, B2, B2, B3, B7, B10, B9, B6, B5, B4, B13].

For Batch 2, the Previous Order is: [B1, B2, B2, B3, B7, B10, B9, B6, B5, B4, B13]. The traditional monotonic tile-processing order would be: [B5, B7, B9, B10, B11, B13, B14, B15]. Using the process 400, the reordered tile-processing order would be: [B13, B5, B9, B7, B11, B14, B15].

The new Previous Order would be: [B1, B2, B2, B3, B10, B6, B4, B13, B5, B9, B7, B11, B14, B15].

Figure 7:
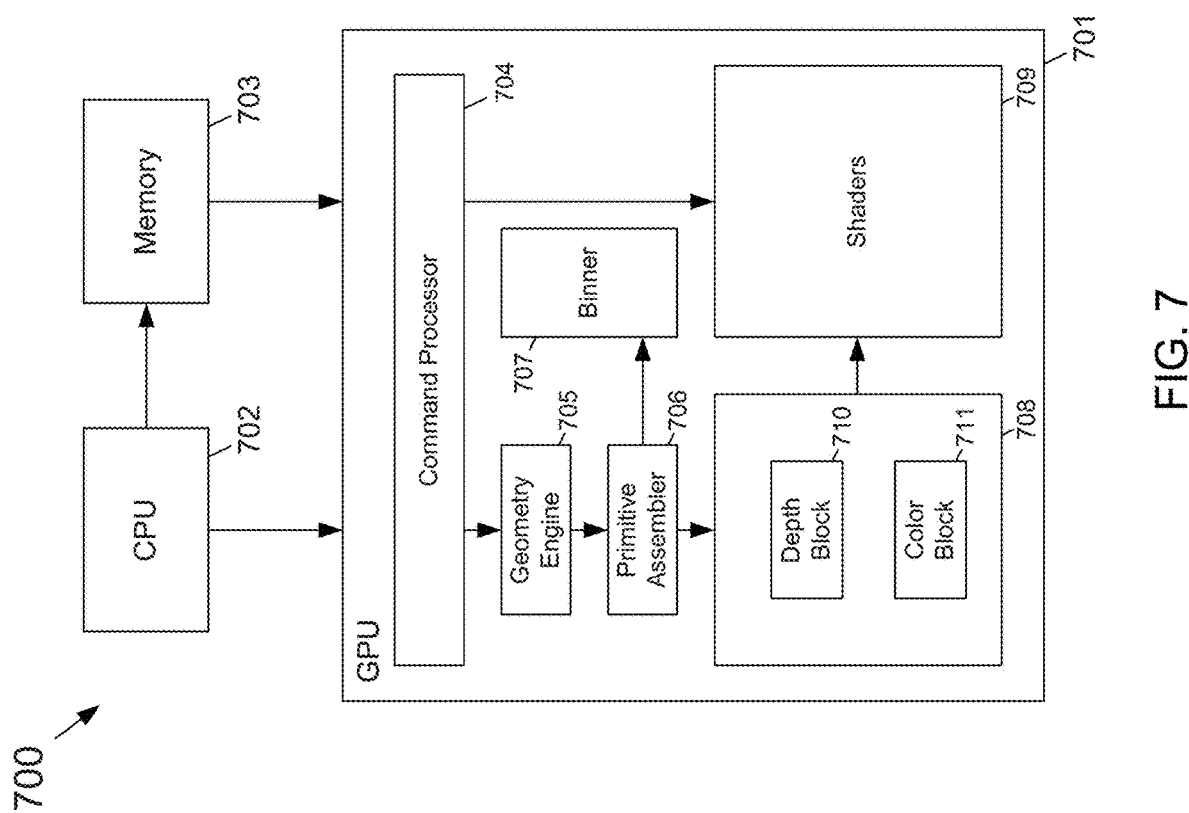
FIG. 7 is a block diagram of a system that includes a GPU that that changes a binning processing order to reduce DRAM traffic according to the subject matter disclosed herein.

FIG. 7 is a block diagram of a system 700 that includes a GPU 701 that that changes a binning processing order to reduce DRAM traffic according to the subject matter disclosed herein. The system 700 may include the GPU 701, a central processing unit (CPU) 702 and a memory 703. The GPU 701 may include a command processor 704, a geometry engine 705, a primitive assembler 706, a binner 707, a rasterizer 708 and one or more shaders 709. The rasterizer 708 may include a depth block 710 and a color block 711. The various components indicated in FIG. 7 as forming the system 700 are interconnected as shown in FIG. 7. In one embodiment, the binner 707 bins primitives into screen tile spaces. After the primitives of a batch are binned into appropriate tiles, the binner 707 propagates each screen space tile (and the primitives binned in the screen space tile) to the rasterizer. The binner 707 changes a binning processing order to reduce DRAM traffic according to the subject matter disclosed herein.

Figure 8:
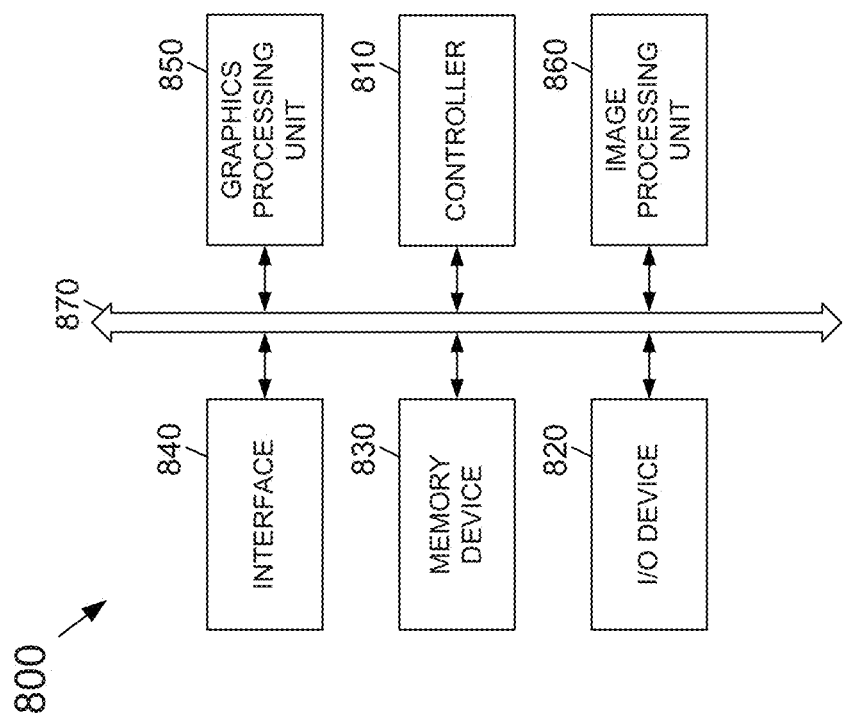
FIG. 8 depicts an electronic device that includes a GPU that changes a binning processing order to reduce DRAM traffic according to the subject matter disclosed herein.

FIG. 8 depicts an electronic device 800 that includes a GPU that changes a binning processing order to reduce DRAM traffic according to the subject matter disclosed herein. Electronic device 800 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 800 may include a controller 810, an input/output device 820 such as, but not limited to, a keypad, a keyboard, a display, a touch-screen display, a camera, and/or an image sensor, a memory 830, an interface 840, a GPU 850, and an imaging-processing unit 860 that are coupled to each other through a bus 870. The GPU 850 may change a binning processing order to reduce DRAM traffic according to the subject matter disclosed herein. The controller 810 may include, for example, at least one microprocessor, at least one digital signal processor, at least one microcontroller, or the like. The memory 830 may be configured to store a command code to be used by the controller 810 or a user data.

Electronic device 800 and the various system components of electronic device 800 may include the image processing unit 860. The interface 840 may be configured to include a wireless interface that is configured to transmit data to or receive data from a wireless communication network using a RF signal. The wireless interface 840 may include, for example, an antenna. The electronic system 800 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service-Time Division Duplex (UMTS-TDD), High Speed Packet Access (HSPA), Evolution Data Optimized (EVDO), Long Term Evolution-Advanced (LTE-Advanced), Multichannel Multipoint Distribution Service (MMDS), Fifth-Generation Wireless (5G), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A method to process tiles of a screen space, the method comprising:
   determining a tile-processing order for tiles of a first batch of primitives based on a temporal data locality of the first batch of primitives with respect to a tile-processing order for a second batch of primitives, the second batch of primitives being processed prior to the first batch of primitives;
   processing the tiles of the first batch of primitives based on the tile-processing order determined for the tiles of the first batch of primitives; and
   updating the tile-processing order as tiles of the first batch of primitives are processed.

2. The method of claim 1, further comprising:
   processing the tiles of a third batch of primitives based on the tile-processing order updated as tiles of the first batch of primitives are processed, the third batch of primitives being subsequent to the first batch of primitives; and
   updating the tile-processing order as tiles of the third batch of primitives are processed.

3. The method of claim 2, wherein a tile-processing direction of the third batch of primitives is opposite to a tile-processing direction of the first batch of primitives.

4. The method of claim 1, wherein a tile-processing direction of the first batch of primitives is opposite to a tile-processing direction of the second batch of primitives.

5. The method of claim 1, wherein updating the tile-processing order as tiles of the first batch of primitives are processed comprises updating the tile-processing order as tile of the first batch of primitives are pushed to a backend processing portion of a graphics processing unit.

6. The method of claim 1, wherein determining the tile-processing order for the tiles of the first batch of primitives comprises arranging the tiles of the first batch of primitives that have a same screen-space as tiles of the second batch of primitives based on a most-recently-processed-tile-to-a-least-recently-processed tile order of the second batch of primitives.

7. The method of claim 1, wherein the first batch of primitives comprises n tiles, and the second batch of primitives comprises n tiles, n being an integer,
   wherein the tile-processing order for the second batch of primitives comprises an order of a least-recently processed tile to a most-recently used tile for the n tiles of the second batch of primitives, and
   wherein determining the tile-processing order for tiles of the first batch of primitives comprises ordering m tiles of the first batch of primitives that have a same screen-space as m tiles of the second batch of primitives to correspond the tile-processing order for the m tiles of the second batch of primitives, m being an integer that is less than or equal to n.

8. The method of claim 7, wherein a tile-processing direction of the first batch of primitives is opposite to a tile-processing direction of the second batch of primitives.

9. A method to process tiles of a screen space, the method comprising:
   determining a tile-processing order for tiles of a first batch of primitives based on a temporal data locality of the first batch of primitives with respect to an observed tile-processing order, the first batch of primitives comprising n tiles, the observed tile-processing order being based on an order of a least-recently processed tile to a most-recently used tile for a second batch of primitives, the second batch of primitives comprising n tiles, and the second batch of primitives being processed prior to the first batch of primitives, n being an integer; and
   processing the tiles of the first batch of primitives based on the tile-processing order determined for the tiles of the first batch of primitives.

10. The method of claim 9, further comprising updating the observed tile-processing order as tiles of the first batch of primitives are processed.

11. The method of claim 10, wherein determining the tile-processing order for tiles of the first batch of primitives comprises ordering m tiles of the first batch of primitives that have a same screen-space as m tiles of the second batch of primitives to correspond the tile-processing order for the m tiles of the second batch of primitives in which m is less than or equal to n.

12. The method of claim 10, further comprising:
   processing the tiles of a third batch of primitives based on the observed tile-processing order as updated as tiles of the first batch of primitives are processed, the third batch of primitives being subsequent to the first batch of primitives; and
   updating the observed tile-processing order as tiles of the third batch of primitives are processed.

13. The method of claim 12, wherein a tile-processing direction of the third batch of primitives is opposite to a tile-processing direction of the first batch of primitives.

14. The method of claim 10, wherein updating the tile-processing order as tiles of the first batch of primitives are processed comprises updating the tile-processing order as tile of the first batch of primitives are pushed to a backend processing portion of a graphics processing unit.

15. The method of claim 9, wherein a tile-processing direction of the first batch of primitives is opposite to a tile-processing direction of the second batch of primitives.

16. A method to process tiles of a screen space, the method comprising:
   determining a tile-processing order for tiles of a first batch of primitives based on a temporal data locality of the first batch of primitives with respect to a tile-processing order for a second batch of primitives, the second batch of primitives being processed prior to the first batch of primitives, the tile-processing order for the tiles of the first batch of primitives comprising an ordering of tiles of the first batch of primitives being based on a temporal proximity of tiles of the first batch of primitives with a most-recently-processed-tile-to-a-least-recently-processed tile order of the second batch of primitives;
   processing the tiles of the first batch of primitives based on the tile-processing order determined for the tiles of the first batch of primitives; and
   updating the tile-processing order as tiles of the first batch of primitives are processed.

17. The method of claim 16, further comprising:
   processing the tiles of a third batch of primitives based on the tile-processing order updated as tiles of the first batch of primitives are processed, the third batch of primitives being subsequent to the first batch of primitives; and updating the tile-processing order as tiles of the third batch of primitives are processed.

18. The method of claim 17, wherein a tile-processing direction of the third batch of primitives is opposite to a tile-processing direction of the first batch of primitives.

19. The method of claim 16, wherein the first batch of primitives comprises n tiles, and the second batch of primitives comprises n tiles, n being an integer, and wherein determining the tile-processing order for tiles of the first batch of primitives further comprises ordering m tiles of the first batch of primitives that have a temporal proximity with m tiles of the second batch of primitives, m being an integer that is less than or equal to n.

20. The method of claim 19, wherein a tile-processing direction of the first batch of primitives is opposite to a tile-processing direction of the second batch of primitives.

* * * * *